(12) United States Patent
Brill et al.

(10) Patent No.: US 8,397,587 B2
(45) Date of Patent: Mar. 19, 2013

(54) PADDLE-TYPE FLOWMETER WITH MAGNETIC COUPLING

(75) Inventors: Reiner Brill, Nidda (DE); Kai Haemel, Jossgrund (DE); Ulrich Rehnelt, Bad Camberg (DE); Karsten Viereck, Regensburg (DE)

(73) Assignee: Maschinenfabrik Reinhausen GmbH, Regensburg (DE)

( * ) Notice: Subject to any disclaimer, the term of this patent is extended or adjusted under 35 U.S.C. 154(b) by 235 days.

(21) Appl. No.: 12/747,206

(22) PCT Filed: Jan. 31, 2009

(86) PCT No.: PCT/EP2009/000649
§ 371 (c)(1),
(2), (4) Date: Jul. 15, 2010

(87) PCT Pub. No.: WO2009/115162
PCT Pub. Date: Sep. 24, 2009

(65) Prior Publication Data
US 2011/0113894 A1 May 19, 2011

(30) Foreign Application Priority Data
Mar. 20, 2008 (DE) .......................... 10 2008 015 158

(51) Int. Cl.
G01F 1/115 (2006.01)
G01F 1/28 (2006.01)
(52) U.S. Cl. .................................. 73/861.94; 73/861.76
(58) Field of Classification Search .......................... None
See application file for complete search history.

(56) References Cited

U.S. PATENT DOCUMENTS

| 2,564,676 | A |   | 8/1951  | Crouse            |           |
|-----------|---|---|---------|-------------------|-----------|
| 2,917,922 | A |   | 12/1959 | Morse             |           |
| 3,761,657 | A | * | 9/1973  | Miller            | 200/81.9 R |
| 4,668,911 | A | * | 5/1987  | Mueller et al.    | 324/207.18 |
| 4,713,972 | A | * | 12/1987 | Stockburger       | 73/861.76 |
| 4,841,782 | A | * | 6/1989  | Buchanan          | 73/861.74 |
| 4,938,076 | A | * | 7/1990  | Buchanan          | 73/861.53 |
| 6,239,446 | B1|   | 5/2001  | Cholin            |           |
| 6,331,820 | B1| * | 12/2001 | Borbath et al.    | 340/606   |

FOREIGN PATENT DOCUMENTS

| DE | 2245882    | A | 3/1974  |
|----|------------|---|---------|
| DE | 3317923    | B | 11/1983 |
| DE | 3814455    | B | 11/1989 |
| DE | 1156994    | B | 11/2003 |
| DE | 102004013024 | A | 11/2004 |

OTHER PUBLICATIONS

Qualitrol Technical Data Sheet: Oil Flowmeter Series 092 [Technisches Datenblatt Qualitrol: Ölströmungsmelder Serie 092], Mar. 1992.
Leenders, P C "Magnetische Tandwielen" PT Electrotechniek, Elektronica, vol. 44, No. 10 Oct. 1, 1989, p. 46.

* cited by examiner

*Primary Examiner* — Harshad R Patel
(74) *Attorney, Agent, or Firm* — Andrew Wilford

(57) ABSTRACT

The invention relates to a flow monitor for monitoring the flow of flowing media, wherein a paddle projecting into the flow transfers the rotating movement of the paddle onto a display device by means of a magnetic gear comprising a plurality of individual magnets corresponding with each other.

7 Claims, 6 Drawing Sheets

PADDLE-TYPE FLOWMETER WITH MAGNETIC COUPLING

CROSS REFERENCE TO RELATED APPLICATIONS

This application is the US national phase of PCT application PCT/EP2009/000649, filed 31 Jan. 2009, published 24 Sep. 2009 as 2009/115162, and claiming the priority of German patent application 102008015158.0 itself filed 20 Mar. 2008, whose entire disclosures are herewith incorporated by reference.

FIELD OF THE INVENTION

The invention relates to a flowmeter for monitoring fluids in pipes, in particular for monitoring the flow and thus the pump function of cooling systems on electric transformers.

BACKGROUND OF THE INVENTION

Such flowmeters are known in numerous embodiments. DE 3,317,923 describes such a flowmeter, termed a flow switch, that has a paddle projecting into the fluid flow to be monitored. A pivotal rod carrying the paddle has a free end carrying a permanent magnet that cooperates with a Reed switch. Thus, like numerous other similar flowmeters, this paddle forms in the flow a flow resistance. If the flow level is sufficient, it pivots the paddle in the flow direction, as a rule against the force of a spring. In most cases, this movement is converted into rotation in order to activate a mechanical display or electrical switch.

Another flowmeter having a similar construction is known from the publication Qualitrol Technical Data Sheet: Oil Flowmeter Series 092" [Technisches Datenblatt Qualitrol: Ölströmungsmelder Serie 092], publication date: March 1992. Here as well, a mechanical actuating force is exerted on a flag (i.e. paddle) placed in the flow.

However, all currently known flowmeters of the type described above have certain disadvantages:

On the one hand, they tend to jam in their final positions for different reasons. This is often due to the fact that the mount is inadequate, the rotatable shaft is twisted, or the actuating force is not sufficient by virtue of the construction of the flowmeter. Moreover, the known flowmeters are sensitive to the turbulence often produced by pumps, such that the display wobbles or the necessary force for moving the display is not sufficient. Occasionally, nonactivation may also be found due to cavitation and turbulent, nonlaminar flow.

OBJECT OF THE INVENTION

The object of the invention is therefore to provide a flowmeter of the type described above that has a simple structure and is easy to install, but still has a high degree of functional reliability and low mechanical resistance while still providing a high degree of actuating force for the display.

SUMMARY OF THE INVENTION

This object is attained according to the invention by a flowmeter in which the paddle is connected to a rotatable first shaft whose rotation may be transferred in a contact-free fashion to a second shaft carrying a pointer. The first shaft and the second shaft are perpendicular to one another and a magnetic gear is provided between the first and second shafts with an actuator part on the first shaft and a drive part on the second shaft.

The flowmeter according to the invention has a simple structure and comprises only a few components; it is robust and allows for simple installation and adjustment. A "magnetic gear" is used in the invention. High levels of actuation force are generated without mechanical friction on a separate shaft by the motion deflection of the rotation of the paddle.

According to a particularly advantageous embodiment of the invention, the paddle has an involute shape. In this manner, a constant actuating force may be attained over the entire rotational angle.

According to another advantageous embodiment, the paddle is constructed as a cup-shaped upstream-open flow body, similar to a spoon, which at the same time minimizes the influence of any turbulent flow in the pipe because increased dynamic pressure is able to build up upstream of the paddle.

BRIEF DESCRIPTION OF THE DRAWING

The invention is described in greater detail below by way of example with reference to the drawings in which.

DETAILED DESCRIPTION

Figure 1:
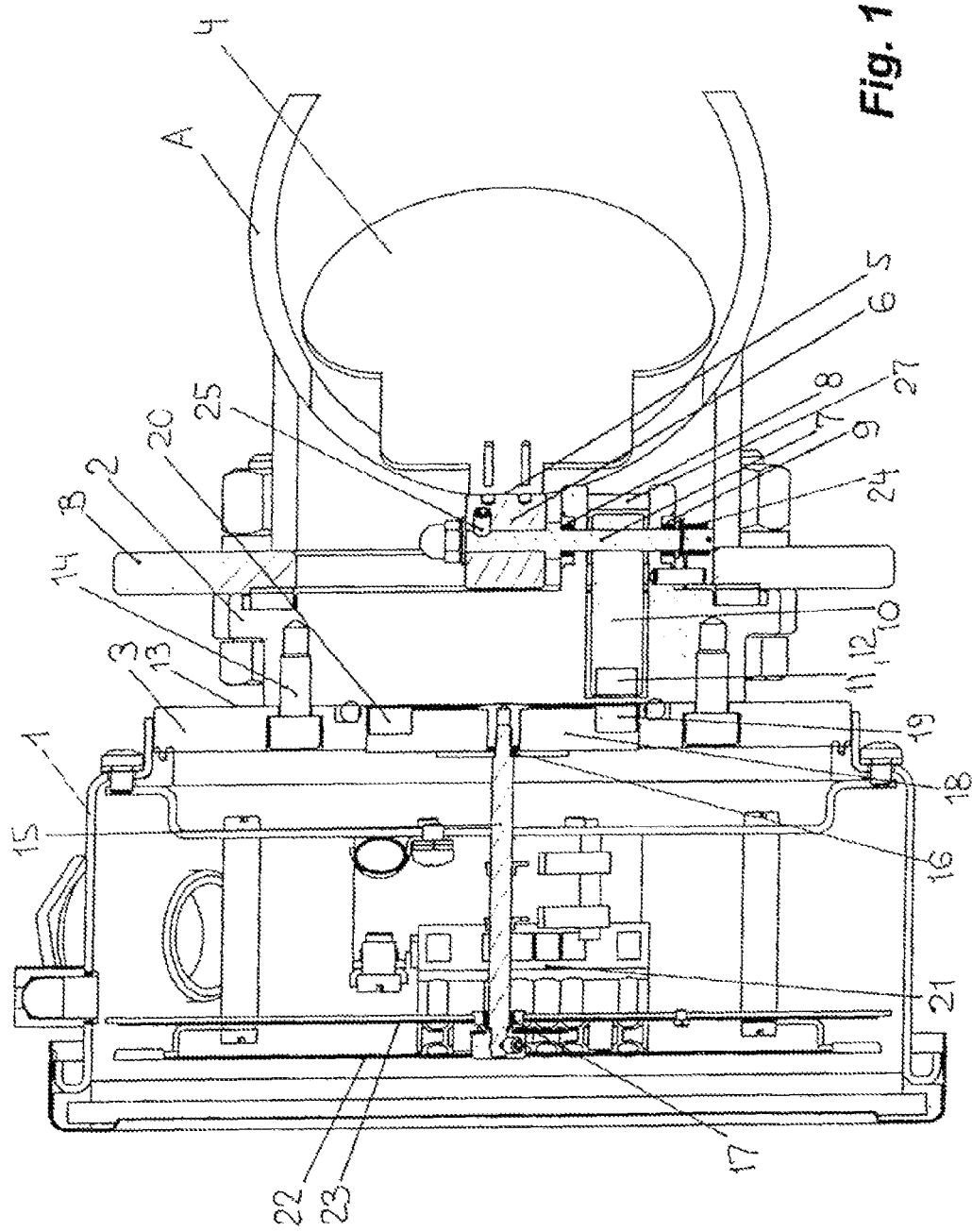
FIG. 1 is schematic cross-section through a flowmeter according to the invention.
Figure 2:
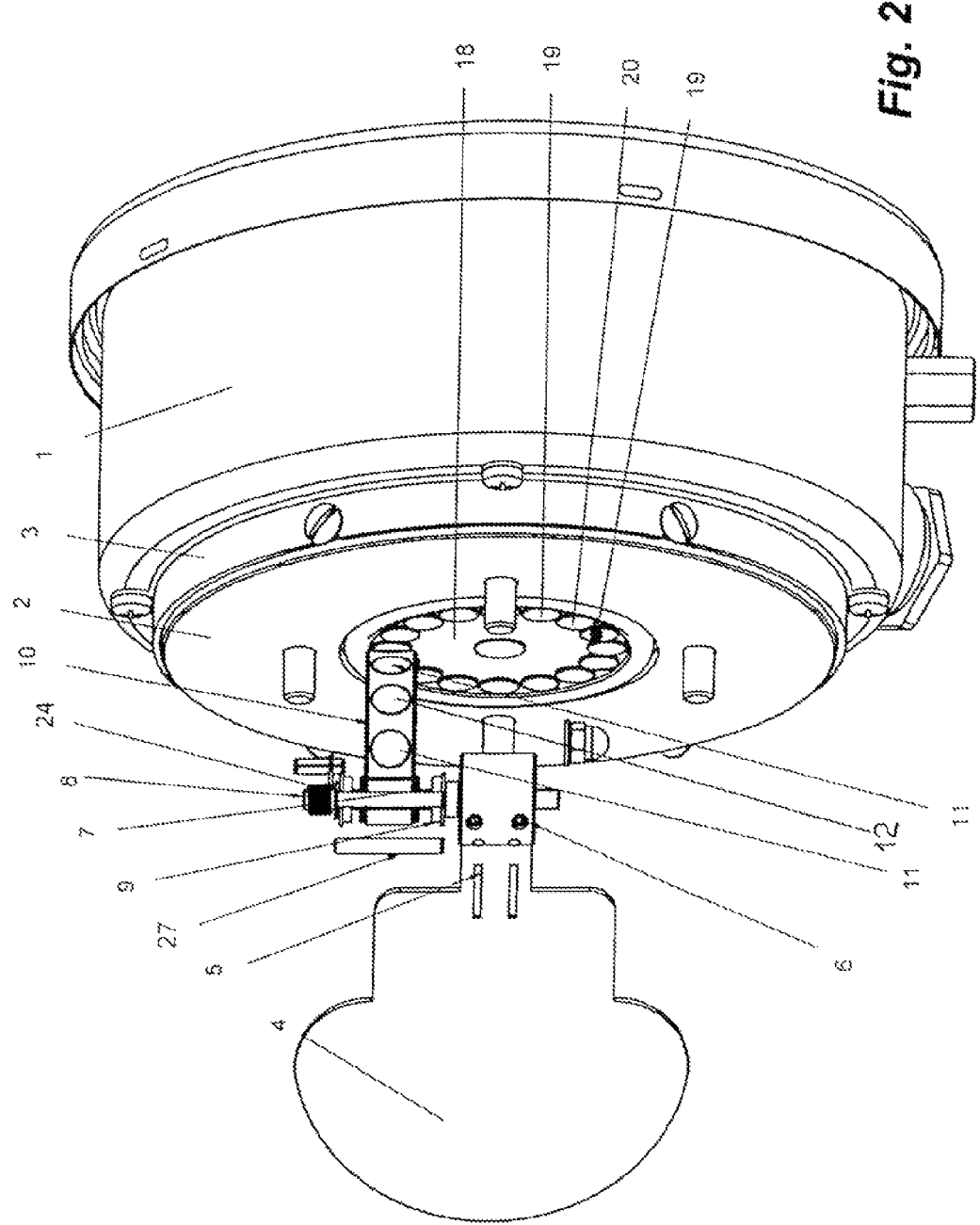
FIG. 2 is a schematic depiction of a flowmeter without its mounting plate.

First, the construction shown in FIG. 1 shall be described.

A flowmeter according to the invention intended to monitor the flow in a pipe A is bolted to a flange B of this pipe A provided especially for this purpose.

The flowmeter itself comprises a housing 1 and a mounting plate 2 bolted to it. To this end, a flange 3 to which the mounting plate 2 mentioned above is bolted is provided on the housing 1. A paddle 4 is pivotally mounted on the plate 2. To this end, the paddle 4 is formed with a bar 5 to which a bracket 6 is attached. This bracket 6 and therefore the paddle 4 are fixed to a rotatable shaft 7. The shaft 7 is supported on the mounting plate 2 by bearings 8 and 9. A sector plate 10 having an is circularly arcuate outer edge is attached in turn to the rotatable shaft 7. Magnets, specifically N magnets 11 alternating with S magnets 12 polarized radially to the mounting plate 2 and thus to the flange 3, are fitted to the edge of the sector plate 10.

As discussed above, the mounting plate 2 is bolted to the housing 1. To this end, the housing 1 has the complementary flange 3 described above with a flat imperforate rim 13. The bolts 14 used for securing the mounting plate 2 are also shown. An additional rotatable shaft 15, which is rotatable in the housing 1 on bearings 16 and 17, extends through the housing 1 perpendicular to the plane of the bolted mounting plate 2. On its side facing away from the mounting flange 2 in its installed state, the shaft 15 carries a magnetic disk 18 on which magnets are also located, specifically N magnets 19 and S magnets 20. These magnets alternate in the same pattern as the magnets 11 and 12 described above on the edge of the sector plate 10. They are complementarily arrayed and thus form a magnetic gear operating in a contact-free manner, also described as a "magnetic gear." In addition, electrical circuitry 21 and/or means for operating electrical switches is provided on the rotatable shaft 15. On the free end of the rotatable shaft 15, a pointer 22 is attached that moves along a display scale 23.

In the case of flow in the pipe A, the paddle 4 is deflected against the force of a torque spring 24 acting on the shaft 7, thus rotating the shaft 7 and the sector plate 10 carried by it with the magnets 11 and 12 mounted on its edge. By transferring the magnetic forces onto the magnetic disk 18, or more accurately the magnets 19 and 20, which occurs in a contact-free fashion, the shaft 15 is rotated in the housing 1. As a result, the electrical circuit 21 is activated and the pointer 22, which moves over the scale 23, is moved.

In addition, a stop 27 is shown that limits the maximum deflection of the paddle 4.

Figure 3:
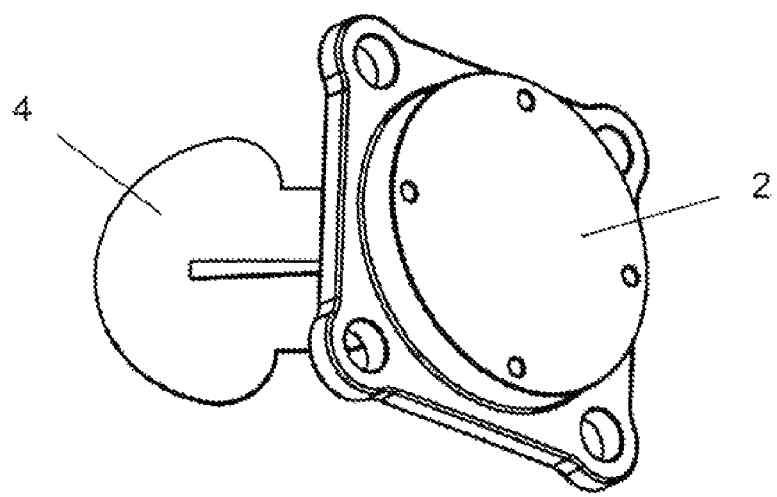
FIG. 3 is a perspective view of a mounting plate by itself from the rear.

FIG. 3 shows the mounting plate 2 alone in a different scale, specifically viewed from the side that is bolted onto the flange 3 of the housing 1.

Figure 4:
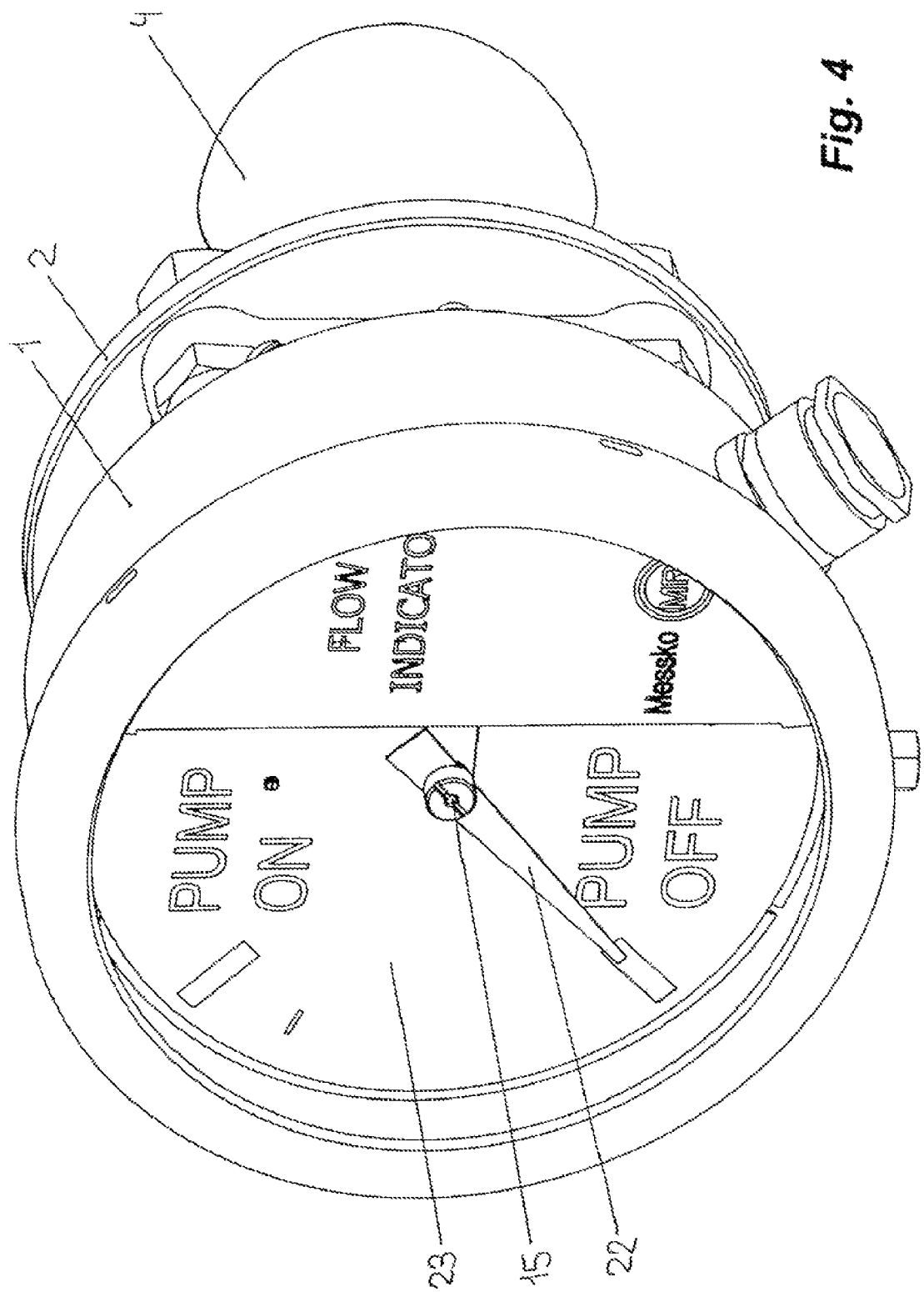
FIG. 4 is a perspective view of a flowmeter according to the invention from the front, the display side.

FIG. 4 shows the complete flowmeter from the front side, on which the pointer 22 and scale 23 are located.

Figure 5:
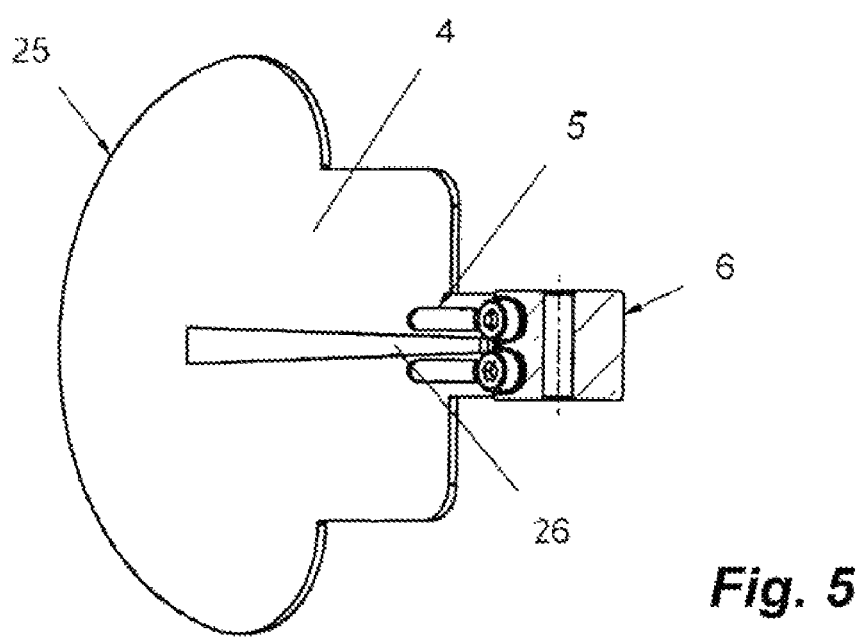
FIG. 5 shows a first embodiment of a paddle.

FIG. 5 shows a paddle 5 alone. Here, a possible shape 25 of the paddle may be seen by means of which a constant flow force is achieved to the greatest degree possible. In addition, an incoming flow ridge 26 may also be seen that induces a high coefficient of resistance that at least reduces the disruptive influence of turbulent flow in the pipe A.

Figure 6:
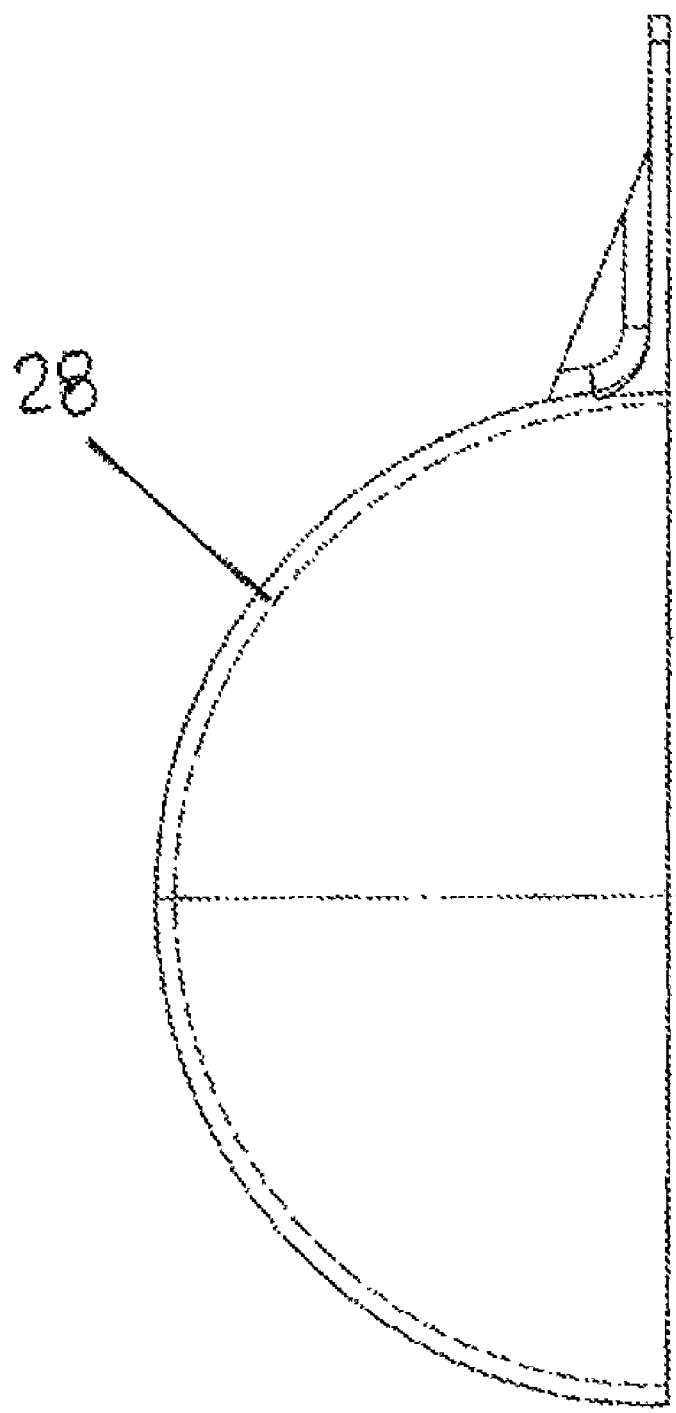
FIG. 6 shows a further embodiment of a paddle with a cup-shaped flow body.

FIG. 6 shows an additional advantageous embodiment of a paddle as a cup-shaped flow body 28. Such an embodiment attains a particularly high level of flow force over the entire rotational angle.

Figure 7:
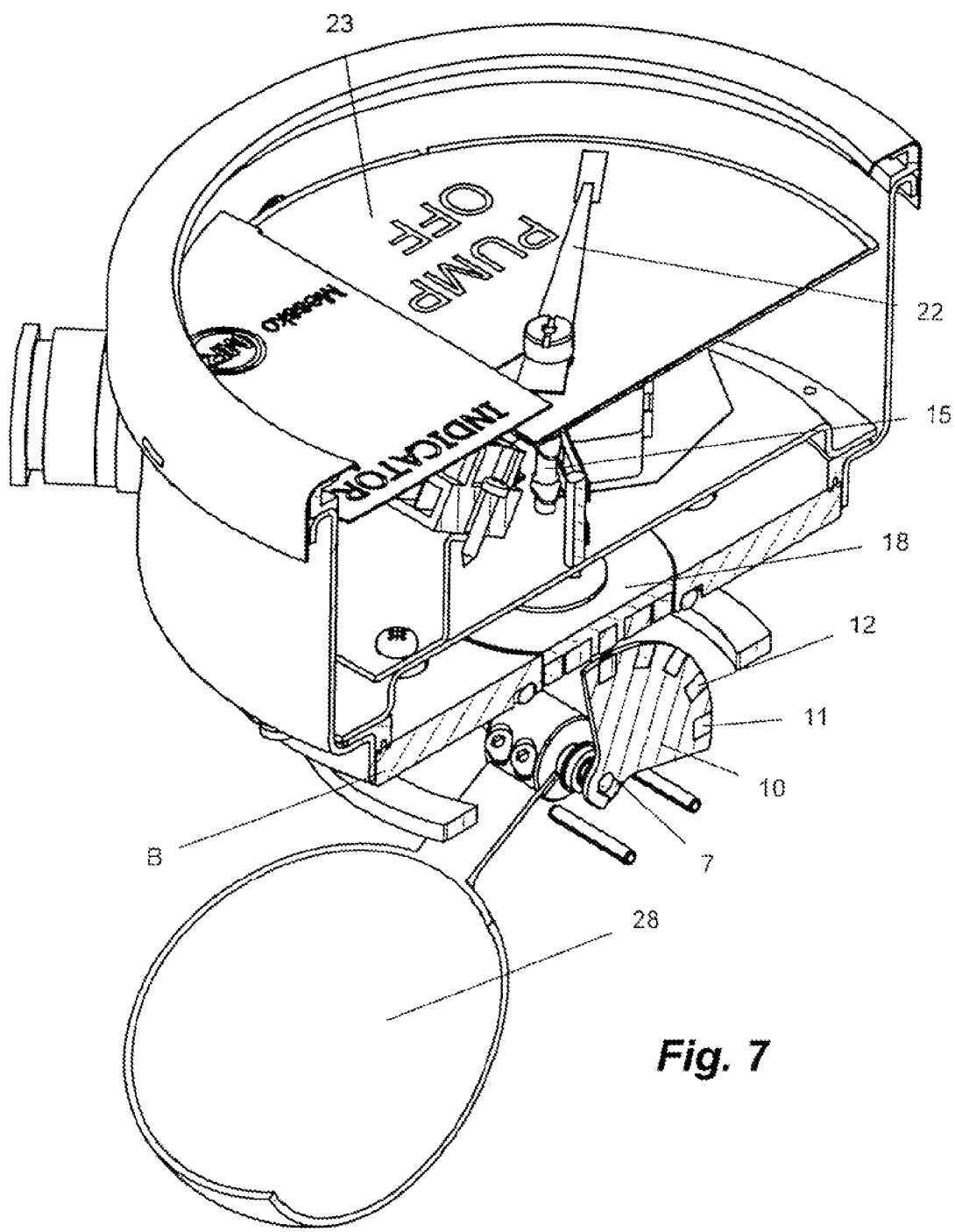
FIG. 7 is a schematic partial view of another flowmeter according to the invention.

FIG. 7 is a schematic perspective section through a flowmeter within the framework of the invention. Here, the cup-shaped flow body 28 discussed in the preceding paragraph is concave upstream and is mounted on the oil flowmeter, i.e. attached by means of its flange B to the pipe to be monitored. The flow body is deflected when oil flows in this pipe. The upstream-open flow body 28 is attached to the rotatable shaft 7 that in turn carries the sector plate 10 discussed above on which alternating N magnets 11 and S magnets 12 are mounted. The magnetic disk 18 mounted on the shaft 15 may also be seen here. The magnets alternating on the magnetic disk 18 in the same array are shown in a partial sectional view. The shaft 7 carrying the sector plate 10, and the shaft 15 carrying the magnetic disk 18 are perpendicular to each other. In this manner, the cooperating magnets correspond with one another in the manner of a "magnetic gear" so that, if flow is present, the approach flow body 28 is deflected and turns the sector plate 10. This rotation is transferred in a contact-free manner to the shaft 15 and thus to the pointer 22 that moves across the scale located below it, by means of the "magnetic gear" described above via the magnetic disk 18.

According to the invention, deflection of the paddle 4 or the flow body 28 acting in the same manner is first converted into rotation of the shaft 7 and thus of the sector plate 10. Only rotation of this shaft leads to rotation of the additional shaft 15 perpendicular thereto. In conjunction with the effect of the "magnetic gear" operating in a contact-free fashion, a gear arrangement results that allows high actuating forces and that is not associated with the danger of jamming at the end position.

The prior art discloses only the arrangement of a simple magnet hub by means of which a 1:1 transmission of the rotational movement occurs from a paddle to a display pointer; in contrast, the invention allows a contact-free actual gearing with the option of changing the transmission ratio of this rotational movement as a function of the dimensions of the sector plate 10 and the magnetic disk 18 within broad limits.

The flowmeter according to the invention is particularly suitable for monitoring pump function in transformer cooling systems. It may be used in a particularly advantageous fashion in transformers with forced oil circulation, for example, OFAF (oil-forced/air-forced) and ODAF (oil-direct/air-forced) transformers.

The invention claimed is:

1. In combination with a pipe through which fluid can flow in a flow direction, a flowmeter comprising:
    a housing mountable on the pipe;
    a paddle shaft extending along and pivotal on the pipe about a paddle axis;
    a paddle carried on the paddle shaft and angularly displaceable in the pipe about the paddle axis between a rest position extending transversely of the direction in the pipe and at least partially blocking flow therethrough, and a deflected position;
    a spring operatively braced between the paddle and the housing and urging the paddle into the rest position;
    an indicator shaft extending along and pivotal on the pipe about an indicator axis generally perpendicular to the paddle axis;
    a scale on the housing;
    a pointer on the indicator shaft shiftable on rotation of the indicator shaft along the scale; and
    a respective element fixed on each of the paddle and indicator shafts and each carrying a respective arcuate array of permanent magnets centered on the respective axis, the elements being juxtaposed but not touching so that the indicator shaft is magnetically coupled to the paddle shaft.

2. The flowmeter defined in claim 1 wherein the paddle shaft extends generally perpendicular to the flow direction and the indicator shaft is generally perpendicular to a plane including the paddle axis and parallel to the direction.

3. The flowmeter defined in claim 1 wherein the elements are plates fixed on the respective shafts and lying in planes perpendicular to the axis of the respective shafts, the magnets of each array being of alternating polarity.

4. The flowmeter defined in claim 1 wherein the element of the paddle is a sector of a circle.

5. The flowmeter defined in claim 4 wherein the magnets of the paddle element are polarized radially of the paddle axis.

6. The flowmeter defined in claim 5 wherein the magnets of the indicator element are polarized axially of the indicator axis.

7. The flowmeter defined in claim 1 wherein the element of the indicator is circular.

* * * * *